US005348682A

United States Patent [19]

Finley et al.

[11] Patent Number: 5,348,682

[45] Date of Patent: Sep. 20, 1994

[54] STABLE THICKENED AQUEOUS BLEACH COMPOSITIONS

[75] Inventors: Lisa M. Finley; Stephen H. Iding, both of Cincinnati, Ohio

[73] Assignee: The Procter & Gamble Company, Cincinnati, Ohio

[21] Appl. No.: 709,082

[22] Filed: May 30, 1991

Related U.S. Application Data

[63] Continuation of Ser. No. 284,961, Dec. 15, 1988, abandoned.

[51] Int. Cl.[5] .......... C01B 11/06

[52] U.S. Cl. .......... 252/186.36; 252/187.24; 252/187.25; 252/187.27; 252/95

[58] Field of Search .......... 252/187.25, 187.27, 252/187.24, 98, 102, 542, 186.36

[56] References Cited

U.S. PATENT DOCUMENTS

| | | | |
|---|---|---|---|
| 3,684,722 | 8/1972 | Hynam et al. | 252/98 |
| 4,071,463 | 1/1978 | Steinhauer | 252/187.24 |
| 4,579,677 | 4/1986 | Hooper et al. | 252/187.24 |
| 4,594,184 | 6/1986 | Cook et al. | 252/187.24 |
| 4,775,492 | 10/1988 | Vipond et al. | 252/187.24 |
| 5,104,571 | 4/1992 | Cramer | 252/187.24 |

FOREIGN PATENT DOCUMENTS

| | | |
|---|---|---|
| 0256638 | 2/1988 | European Pat. Off. . |
| 0274885 | 7/1988 | European Pat. Off. . |

*Primary Examiner*—Robert L. Stoll
*Assistant Examiner*—Joseph D. Anthony
*Attorney, Agent, or Firm*—Robert B. Aylor

[57] ABSTRACT

Stable, thickened, aqueous bleaching and cleaning compositions contain hypochlorite and a thickening mixture of high molecular weight polycarboxylate polymer and amine oxide detergent surfactant. Optionally, the compositions can also contain fatty acid, as soap, and/or synthetic anionic bleach stable detergent surfactant. The viscosity is between about 150 and 3,000 centipoises to permit easy dispensing, but still provide a coating action. The compositions are especially good for use in cleaning toilet bowls, bathroom tiles, and shower walls.

12 Claims, No Drawings

STABLE THICKENED AQUEOUS BLEACH COMPOSITIONS

This is a continuation of application Ser. No. 07/284,961, filed on Dec. 15, 1988 now abandoned.

TECHNICAL FIELD

This invention relates to compositions containing bleach which can be used for cleaning hard surfaces, especially toilet bowls, bathroom tiles, and shower walls. Such compositions desirably have a low viscosity which permits the consumer to dispense them readily, yet are sufficiently thick so as to provide a coating action that remains on the surface long enough for the bleach to provide effective cleaning action.

BACKGROUND ART

Stable thickened aqueous compositions containing bleach have been formulated before in scouring compositions such as those disclosed in U.S. Pat. Nos.: 3,985,668, Hartman, issued Oct. 12, 1976; 3,684,722, Hynam et al., issued Aug. 15, 1972; and 4,775,492, Vipond et al., issued Oct. 4, 1988; all of said patents being incorporated herein by reference.

SUMMARY OF THE INVENTION

The present stable thickened aqueous cleaning/-bleaching compositions comprise hypochlorite bleach to provide from about 0.4% to about 2%, preferably from about 0.4% to about 1% available chlorine; from about 0.4% to about 1.5% polycarboxylate polymer having a molecular weight of from about 500,000 to about 4,000,000; from 0% to about 1% of fatty acid containing from about 12 to about 18 carbon atoms that is substantially saturated; and from about 0.1% to about 1% of amine oxide detergent, preferably one surfactant containing a single long alkyl chain containing from about 10 to about 20 carbon atoms and two short alkyl chains, the pH of said compositions being from about 10.4 to about 12 and the viscosity being from about 150 to about 3,000 centipoises, and the compositions preferably containing enough reserve alkalinity to stabilize the bleach. Other optional components can also be present, as set forth hereinafter.

DETAILED DESCRIPTION OF THE INVENTION

The Bleach

The bleaching agent of these compositions is one which yields a hypochlorite species in aqueous solution. Bleaching agents which yield a hypochlorite species in aqueous solution include alkali metal and alkaline earth metal hypochlorite and hypochlorite addition products. Specific examples include sodium hypochlorite, potassium hypochlorite, monobasic calcium hypochlorite and dibasic magnesium hypochlorite, and the other bleaching agents disclosed in U.S. Pat. No. 3,985,668 and the other patents, supra, incorporated herein by reference. The preferred compounds are sodium and potassium hypochlorite and especially sodium hypochlorite.

The Polycarboxylate Polymer

The polymers for use herein are polycarboxylate polymers having a molecular weight from about 500,000 to about 4,000,000, preferably from about 1,000,000 to about 4,000,000, with, preferably, from about 0.5% to about 4% cross linking. Preferred polycarboxylate polymers include polyacrylate polymers including those sold under trade names Carbopol®, Acrysol®ICS-1 and Sokalan®. The preferred polymers are polyacrylates. Other monomers besides acrylic acid can be used to form these polymers including such monomers as ethylene and propylene which act as diluents, and maleic anhydride which acts as a source of additional carboxylic groups. The molecular weight per carboxylate group typically varies from about 25 to about 200, preferably from about 50 to about 150, more preferably from about 75 to about 125, and most preferably 100± about 10%.

The molecular weight and level of polycarboxylic polymer are adjusted to give the desired flow properties and product stability at the proper viscosity. The typical range of polycarboxylate polymer is from about 0.4 to about 1.5%, preferably from about 0.4% to about 1.1%, more preferably from about 0.5% to about 0.8%.

Amine Oxide

The amine oxide detergent surfactants for use in the compositions of this invention are preferably those having a single long alkyl chain containing from about 10 to about 20 carbon atoms, preferably from about 12 to about 16 carbon atoms, and most preferably about 14 carbon atoms. In addition, the amine oxide can contain short alkyl chains, preferably containing from 1 to about 4 carbon atoms each. The polycarboxylate polymer described hereinbefore and the amine oxide interact to provide the proper flow properties and product stability. The level of amine oxide detergent surfactant present is from about 0.1 to about 1%, preferably from about 0.1% to about 0.3%, and more preferably about 0.15%.

The polycarboxylate polymer, the amine oxide, and the optional fatty acid soap and/or anionic surfactant, interact to give the desired viscosity range of from about 150 to about 3,000, preferably from about 150 to about 2,000, more preferably from about 150 to about 1,500, most preferably from about 200 to about 1,000, centipoises when measured at 25° C. with a Brookfield viscometer and a 4 spindle. This desirable viscosity range in these compositions permits the consumer to readily dispense the aqueous composition from conventional packages, yet provides a sufficient amount of "cling" so that the composition remains in contact with a hard surface, even one which is not horizontal, for a sufficient period of time to provide efficient cleaning. These compositions are very useful for cleaning toilet bowls, especially when packaged in typical "squeeze bottles" or in packages with a small orifice opening or spray dispenser.

The Fatty Acid

Fatty acids which are preferably used herein include those essentially saturated, preferably completely saturated, fatty acids containing from about 12 to about 18 carbon atoms. Suitable fatty acids can be either derived from naturally occurring materials like coconut oil and palm kernel oil, or can be derived from synthetically produced fatty acids. The range of fatty acid content in the composition of this invention is from 0% to about 1%, preferably from about 0.1% to about 0.3%, and more preferably about 0.15%. The fatty acid is highly desirable.

The pH of the compositions of this invention varies from about 10.4 to about 12, preferably from about 10.8 to about 11.5, and more preferably about 11.1. In addition to the pH requirement, there should also be enough reserve alkalinity to stabilize the bleach. (This reserve alkalinity typically varies from about 0.5 to about 3.0, preferably from about 0.5 to about 2.5, more preferably from about 0.5 to about 1.2.)

Optional Ingredients

In addition to the essential ingredients above, the compositions can also contain synthetic anionic detergent surfactant at a level of from 0% to about 5%, preferably from about 0.5% to about 2%. Suitable bleach stable anionic surfactants are disclosed in U.S. Pat. No. 3,985,668, supra, incorporated herein. The alkyl sulfates disclosed in said patent and paraffin sulfonates are preferred. Other anionic surfactants which are stable in bleach compositions can also be used.

Other ingredients which can be present include bleach stable colors, e.g., dyes, pigments, etc., perfumes, etc. These ingredients are added to provide aesthetic benefits.

Other optional and desirable components include the clays and the abrasives disclosed in U.S. Pat. No. 3,985,668, supra, incorporated herein by reference.

The most preferred clays are selected from smectites, attapulgites, and mixtures of smectites and attapulgites, especially those that are expandable layered clays.

The abrasive materials can be any of the abrasive materials and filler materials disclosed in U.S. Pat. No. 3,985,668, supra, incorporated herein. Preferred abrasive materials include perlite, silica and calcium carbonate having diameters of about 15μ or smaller.

The following examples illustrate the practice of this invention. As used herein, all percentages, parts and ratios are by weight unless otherwise stated.

| Component | Wt. % |
|---|---|
| Bentonite Clay | 0.10 |
| Carbopol 617 (Polyacrylate, M.W. 1-4,000,000) | 0.75 |
| Sodium Paraffin Sulfonate (NaPS) | 1.00 |
| Sodium Hypochlorite Bleach (NaOCl) (available chlorine) | 0.95 |
| Green Dye | 0.009 |
| Blue Dye | 0.001 |
| Perfume | 0.25 |
| Potassium Carbonate | 5.00 |
| Sodium Hydroxide | 0.29 |
| Coconut Fatty Acid | 0.15 |
| $C_{12-14}$ Alkyl Dimethylamine Oxide | 0.15 |
| Water | 91.35 |
| Total | 100.00 |
| pH | 11.0 |
| Viscosity | 580 |
| Density | 1.058 |

This product was stable to at least three weeks.

| Component | Wt. % |
|---|---|
| Coconut Fatty Acid | 0.15 |
| $C_{12-14}$ Alkyl Dimethylamine Oxide | 0.15 |
| Carbopol 617 | 0.75 |
| Potassium Carbonate | 5.00 |
| Sodium Paraffin Sulfonate (NaPS) | 1.00 |
| Sodium Hypochlorite Bleach (NaOCl) (available chlorine) | 0.95 |
| Green Dye | 0.009 |
| Blue Dye | 0.001 |
| Perfume | 0.25 |
| Sodium Hydroxide | 0.29 |
| Water | 91.45 |
| Total | 100.00 |
| pH | 11.0 |
| Viscosity | 270 |
| Density | 1.052 |

This product was also stable to at least three weeks.

What is claimed is:

1. A stable, thickened, aqueous cleaning and bleaching composition consisting essentially of:
   A. hypochlorite bleach to provide from about 0.4% to about 1.2% available chlorine;
   B. from about 0.4% to about 1.5% polycarboxylate polymer having a molecular weight from about 500,000 to about 4,000,000;
   C. from about 0.1% to about 1% of an amine oxide detergent surfactant;
   D. from 0% to about 1% of fatty acid soap containing from about 12 to about 18 carbon atoms; and
   E. the balance water; the viscosity being adjusted to within the range of from about 150 to about 3,000 centipoises and the pH being from about 10.4 to about 12.

2. The composition of claim 1 containing from about 0.5% to about 2% of bleach stable synthetic anionic detergent surfactant.

3. The composition of claim 1 wherein said polycarboxylate polymer B. has a molecular weight of from about 1,000,000 to about 4,000,000 and the level is from about 0.4% to about 1.1%, and said amine oxide detergent surfactant C. has a single long alkyl chain containing from about 10 to about 20 carbon atoms and two short chains containing from 1 to about 4 carbon atoms and is present at a level of from about 0.1% to about 0.3%, the viscosity of the composition being from about 150 to about 2,000 centipoises.

4. The composition of claim 2 wherein said polycarboxylate polymer B. is present at a level of from about 0.5% to about 0.8%.

5. The composition of claim 3 wherein the pH is from about 10.8 to about 11.5.

6. The composition of claim 4 wherein said fatty acid is present at a level of from about 0.1% to about 0.3%.

7. The composition of claim 1 wherein said polycarboxylate polymer B. is polyacrylate.

8. The composition of claim 7 containing from about 0.5% to about 2% of bleach stable synthetic anionic detergent surfactant 9. The composition of claim 7 wherein said polycarboxylate polymer B. has a molecular weight of from about 1,000,000 to about 4,000,000 and the level is from about 0.4% to about 1.1%, and said amine oxide detergent surfactant C. has a single long alkyl chain containing from about 10 to about 20 carbon atoms and two short chains containing from 1 to about 4 carbon atoms and is present at a level of from about 0.1% to about 0.3%, the viscosity of the composition being from about 200 to about 2,000 centipoises.

10. The composition of claim 9 wherein said polycarboxylate polymer B. is present at a level of from about 0.5% to about 0.8%.

11. The composition of claim 10 wherein the pH is from about 10.8 to about 11.5.

12. The composition of claim 10 wherein said fatty acid is present at a level of from about 0.1% to about 0.3%.

* * * * *

UNITED STATES PATENT AND TRADEMARK OFFICE

CERTIFICATE OF CORRECTION

PATENT NO. : 5,348,682

DATED : September 20, 1994

INVENTOR(S) : Lisa M. Finley and Stephen H. Iding

It is certified that error appears in the above-identified patent and that said Letters Patent is hereby corrected as shown below:

Col. 4, line 39 , "claim 2" should read -- claim 3 --.

Col. 4, line 42, "claim 3" should read -- claim 4 --.

Signed and Sealed this

Eighteenth Day of June, 1996

*Attest:*

BRUCE LEHMAN

*Attesting Officer*

*Commissioner of Patents and Trademarks*